(12) United States Patent
Nishino

(10) Patent No.: US 11,575,804 B2
(45) Date of Patent: Feb. 7, 2023

(54) IMAGE FORMING APPARATUS THAT CHANGES BEHAVIOR SETTING ACCORDING TO INSTRUCTION FROM EXTERNAL DEVICE

(71) Applicant: KYOCERA Document Solutions Inc., Osaka (JP)

(72) Inventor: Tetsuya Nishino, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/694,879

(22) Filed: Mar. 15, 2022

(65) Prior Publication Data
US 2022/0303431 A1 Sep. 22, 2022

(30) Foreign Application Priority Data
Mar. 19, 2021 (JP) .............................. JP2021-045914

(51) Int. Cl.
*H04N 1/44* (2006.01)
*G06F 21/60* (2013.01)
(52) U.S. Cl.
CPC ......... *H04N 1/4413* (2013.01); *G06F 21/608* (2013.01); *H04N 1/4433* (2013.01)
(58) Field of Classification Search
CPC .. H04N 1/4413; H04N 1/4433; G06F 21/608; G06F 2221/2141; G06F 21/31; G06F 21/74
See application file for complete search history.

(56) References Cited

U.S. PATENT DOCUMENTS 10,885,507 B1 * 1/2021 Phillips .............. G06Q 20/1085
2006/0290967 A1 * 12/2006 Sumitomo .............. G06F 21/10
358/1.14

FOREIGN PATENT DOCUMENTS

JP 2008294572 A 12/2008

* cited by examiner

*Primary Examiner* — Juan M Guillermety
(74) *Attorney, Agent, or Firm* — IP Business Solutions, LLC

(57) ABSTRACT

An image forming apparatus includes an activator, a command storage device and a controller. The activator activates a customer ID received by a UI, out of customer IDs stored in a customer ID storage device. The command storage device stores the activated customer ID in association with command information received by the UI. The controller changes a function setting of the image forming apparatus, according to the command information received from an external device, despite a security level being set to a high level, when function information included in the command information received from the external device via a communication device accords with the function information included in changeable command information stored in the command storage device.

7 Claims, 7 Drawing Sheets

Fig.2

| CUSTOMER | CUSTOMER ID |
|---|---|
| A COMPANY | 4fh341sd001jku |
| B COMPANY | i4fmhf3se9e9mx |
| C COMPANY | kwp7ifzrnd59ui |
| D COMPANY | b93m4k6uqdtyey |

11a

IMAGE FORMING APPARATUS THAT CHANGES BEHAVIOR SETTING ACCORDING TO INSTRUCTION FROM EXTERNAL DEVICE

INCORPORATION BY REFERENCE

This application claims priority to Japanese Patent Application No. 2021-045914 filed on Mar. 19, 2021, the entire contents of which are incorporated by reference herein.

BACKGROUND

The present disclosure relates to an image forming apparatus.

Image forming apparatuses having a security mode are known. The security mode refers to a function to minimize vulnerability against an access from outside, and includes, for example, a function to restrict an access from a network, and a function to restrict a change of a setting of the image forming apparatus.

SUMMARY

The disclosure proposes further improvement of the foregoing techniques. In an aspect, the disclosure provides an image forming apparatus including a customer ID storage device, a user interface device, a communication device, a control device, and a command storage device. The customer ID storage device contains in advance a list of customer identification information, allocated to each of customers. The user interface device receives an instruction to select one piece of customer identification information to be activated, from the list, and command information including function information indicating functions provided to the image forming apparatus, and parameter information for changing a setting of the function. The communication device communicates with an external device. The control device includes a processor, and acts as a controller and an activator, when the processor executes a control program. The controller permits or restricts an access of the external device via the communication device, according to a pre-specified security level. The activator activates the customer identification information received by the user interface device, out of the customer identification information stored in the customer ID storage device. The command storage device stores therein the activated customer identification information, in association with the command information received by the user interface device, the command information being stored as changeable command information that permits the function setting to be changed, or unchangeable command information that restricts the function setting from being changed, on a basis of the command information received from the external device. The controller further changes, when the security level is set to a low level, the function setting with respect to both of the changeable command information and the unchangeable command information, according to the command information received from the external device via the communication device, decides, when the security level is set to a high level, whether the function information included in the command information received from the external device via the communication device accords with the function information included in the command information stored in the command storage device, with respect to only the changeable command information, keeps from changing the function setting according to the command information received from the external device via the communication device, upon deciding that the function information discords from each other, and changes the function setting according to the command information received from the external device, upon deciding that the function information accords with each other.

BRIEF DESCRIPTION OF THE DRAWINGS

FIG. 2 is a table showing an example of a customer ID list according to the embodiment 1;

DETAILED DESCRIPTION

Hereafter, an embodiment of the disclosure will be described, with reference to the drawings. The same or corresponding elements in different drawings are given the same numeral, and the description thereof will not be repeated.

Embodiment 1

Figure 1:
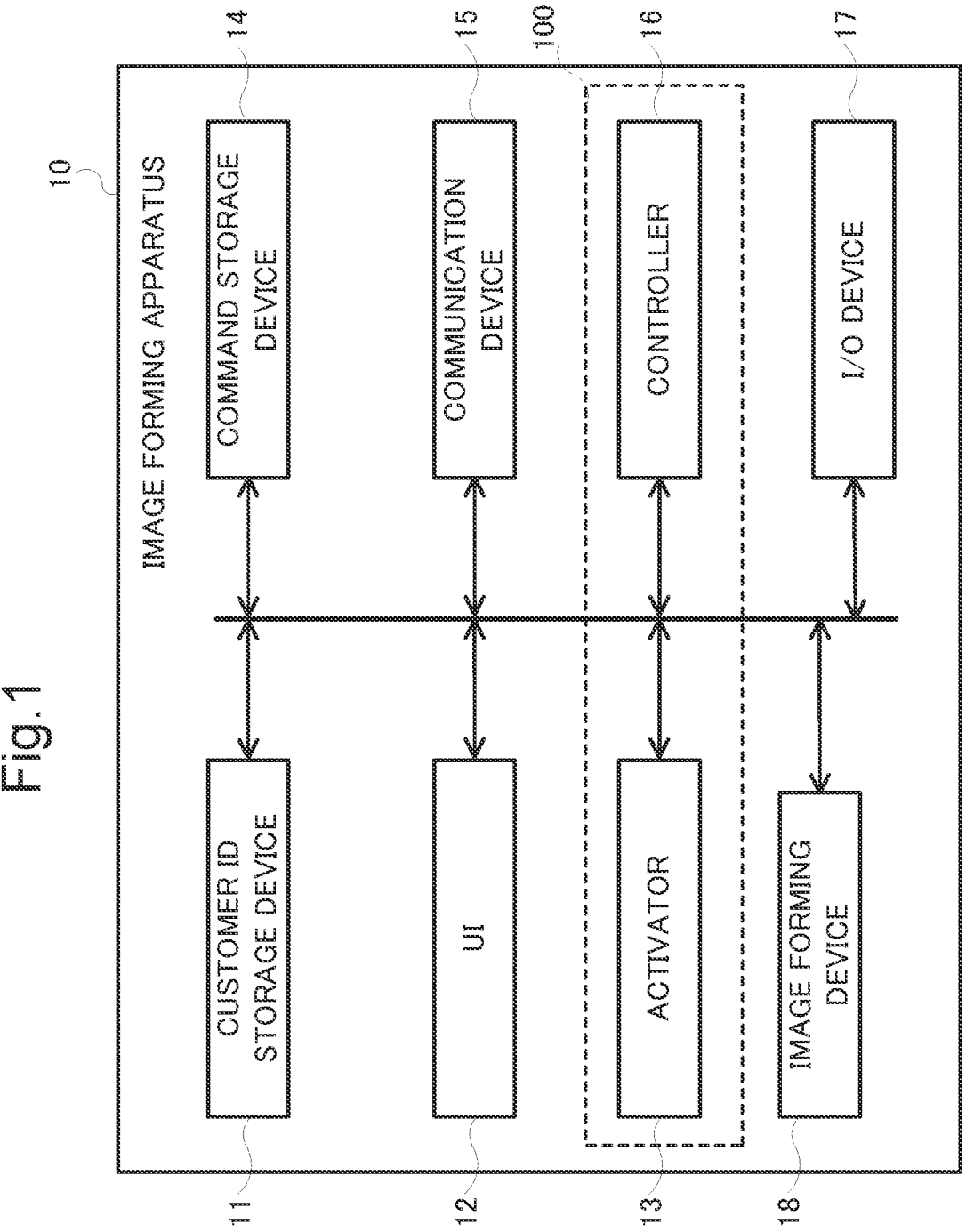
FIG. 1 is a block diagram showing a configuration of an image forming apparatus according to an embodiment 1.

Referring to FIG. 1 to FIG. 7, an image forming apparatus 10 according to an embodiment 1 will be described hereunder. FIG. 1 is a block diagram showing a configuration of the image forming apparatus 10 according to the embodiment 1.

The image forming apparatus 10 includes a customer ID storage device 11, a user interface device 12, a command storage device 14, a communication device 15, a control device 100, and an input/output (I/O) device 17. Hereinafter, the user interface device 12 will be referred to as "UI 12". The image forming apparatus 10 also includes an image forming device 18 that forms an image on a sheet. The image forming apparatus 10 may further include, in addition to the image forming device 18, an image reading device that reads an image on a source document and generates image data, a transmitter/receiver of facsimile, and an e-mail transmitter. Here, the image forming device 18 is an image forming mechanism including a development device, a photoconductor drum, a charging device, an exposure device, a primary transfer roller, a secondary transfer roller, and a fixing device.

The control device 100 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 16 and an activator 13.

The control device 100 acts as the controller 16 and the activator 13, when the processor operates according to a control program stored in the memory incorporated in the control device 100. Here, the controller 16 and the related components may each be constituted in the form of a hardware circuit, instead of being realized according to the control program. This also applies to other embodiments, unless otherwise specifically noted.

The customer ID storage device 11 contains in advance a list of customer identification information, assigned to each of the customers. The list is made up under the management of the manufacturing company of the image forming apparatus 10. Hereinafter, the customer identification information will be referred to as "customer ID", and the list of the customer identification information will be referred to as "customer ID list". The customer ID storage device 11 includes a memory such as a read-only memory (ROM). In the memory, the customer ID list is stored in the form of firmware.

FIG. 2 illustrates an example of the customer ID list 11a according to the embodiment 1. The customer ID list 11a contains a customer ID "4fh341sd001jku" of A company, one of the customers, a customer ID "i4fmhf3se9e9mx" of B company, a customer ID "kwp7ifzrnd59ui" of C company, a customer ID "b93m4k6uqdtyey" of D company, and so forth. It is preferable that the customer ID is given a complicated form, to prevent an illegitimate use.

The UI 12 includes a display device, for example constituted of an LCD, and an operation device provided with a touch panel. In this embodiment, the touch panel is attached to the surface of the display. The UI 12 displays, for example, a screen for registering the function of the image forming apparatus 10, and also receives an instruction inputted by the user. Here, the user includes, in addition to the person who utilizes the image forming apparatus 10, maintenance staff of the manufacturing company of the image forming apparatus 10, and an administrator who manages the image forming apparatus 10.

For example, the controller 16 sets the image forming apparatus 10 to a special mode, such as a maintenance mode executed when the image forming apparatus 10 is delivered to the customer. In the maintenance mode, the UI 12 displays an activation screen for activating the customer ID. The maintenance staff selects a customer ID to be activated, out of the customer ID list 11a, through the UI 12. The UI 12 receives the instruction to select one customer ID to be activated out of the customer ID list 11a, according to the user's operation performed on the UI 12. Here, the term "activate" refers to an operation to designate the customer ID as the object to be registered in association with command information.

Figure 3:
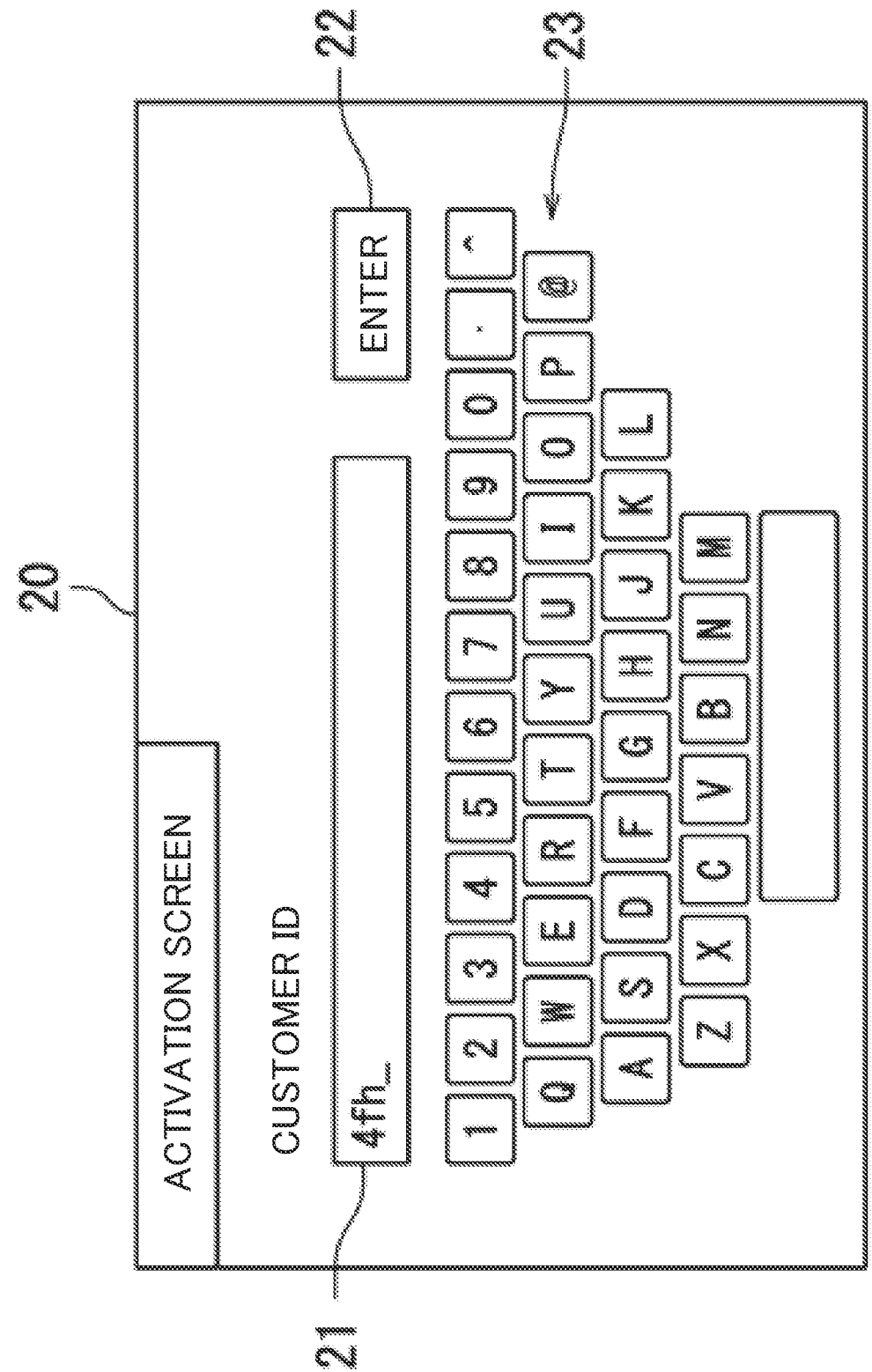
FIG. 3 is a schematic drawing showing an example of an activation screen according to the embodiment 1.

FIG. 3 illustrates an example of the activation screen 20 according to the embodiment 1. The controller 16 causes the display device of the UI 12 to display the activation screen 20. The activation screen 20 shown in FIG. 3 includes a text box 21 for displaying the customer ID, an enter button 22, and a keyboard 23. The maintenance staff is informed of the customer ID of A company in advance, from the manufacturing company of the image forming apparatus 10. The maintenance staff inputs the customer ID to be activated, by operating the keyboard 23 in the activation screen 20, displayed by the UI 12 of the image forming apparatus 10 installed in A company. The controller 16 displays the customer ID inputted to the UI 12, in the text box 21. The activation screen 20 shown in FIG. 3 illustrates the state where the customer ID of A company is being inputted. Upon completely inputting the customer ID, the maintenance staff presses the enter button 22. When the enter button 22 is pressed, the UI 12 acquires the customer ID displayed in the text box 21.

In addition, in the special mode such as the maintenance mode, for example executed when the image forming apparatus 10 is delivered to the customer, the controller 16 causes the display device of the UI 12 to display a registration screen for accepting registration of the function that the image forming apparatus 10 can perform. The maintenance staff designates, through the UI 12, the command information including function information indicating the function that the image forming apparatus 10 can perform, and parameter information for changing the setting of the function. The UI 12 receives the instruction to designate the command information including the function information and the parameter information, according to the operation performed on the UI 12.

The activator 13 activates the customer ID received by the UI 12, out of the customer IDs stored in the customer ID storage device 11. When the activator 13 successfully activates the customer ID, the command information can be registered, in association with the customer ID that has been activated. Here, in the case where the customer ID received by the UI 12 is not included in the customer ID list 11a, the activator 13 does not activate any of the customer IDs. In this case, the activator 13 decides that the activation has failed.

The command storage device 14 stores therein the customer ID that has been activated, in association with the command information received by the UI 12. In other words, the command information is registered in the command storage device 14, in association with the customer ID that has been activated. The command storage device 14 includes memory units such as a ROM, a random-access memory (RAM), a hard disk drive (HDD), or a solid-state drive (SSD).

When a security level, to be subsequently described, is set to a high level, the controller 16 stores specific command information that permits a change based on an instruction from outside, in the command storage device 14 as changeable command information, and stores command information that does not permit a change based on the instruction from outside, in the command storage device 14 as unchangeable information. For example, the command storage device 14 is divided into two storage regions, and the controller 16 stores the changeable command information that permits a change based on an instruction from outside, in one of the regions, and stores unchangeable command information that does not permit a change based on the instruction from outside, in the other storage region. Thus, the changeable command information that permits a change based on an instruction from outside, and the unchangeable command information that does not permit a change based on the instruction from outside, are distinctively stored in the image forming apparatus 10.

The format of the command information will be described hereunder. For example, the following format is adopted as the command information.

!R!KSUS "xxxx", #1, #2, . . . ; EXIT;

In the command information cited above, "xxxx" corresponds to the function information indicating the behavior of the image forming apparatus 10. #1, #2, and so forth correspond to the parameter information for changing the setting of the function. The grammar of the parameter information depends on the type of the function information.

A specific example of the command information will be described hereunder. It is assumed here that the command information is expressed as follows.

!R!KSUS "WKUP", 0; EXIT;

In the command information cited above, "WKUP" is the function information indicating a sleep function of the image forming apparatus 10, and "0" is the parameter information for changing the sleep level of the sleep function. For example, when the parameter information is "0", the sleep level is set such that priority is given to quick recovery, and when the parameter information is "1", the sleep level is set such that priority is given to energy saving.

Figure 4:
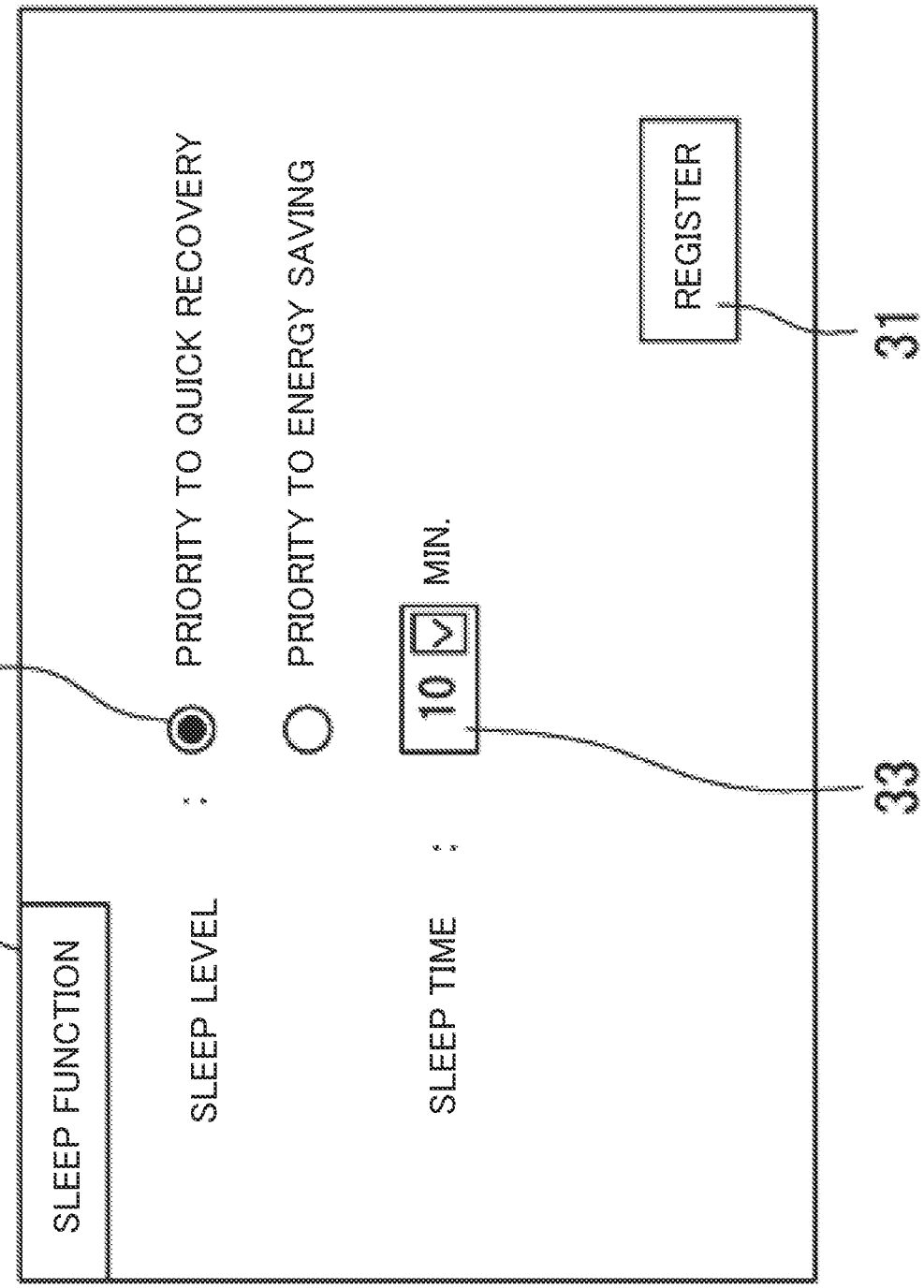
FIG. 4 is a schematic drawing showing an example of a sleep function registration screen according to the embodiment 1.

FIG. 4 illustrates an example of a sleep function registration screen 30 according to the embodiment 1. The controller 16 causes the display device of the UI 12 to display the sleep function registration screen 30. The sleep function registration screen 30 includes a registration button 31, and parameter information such as the sleep level and a sleep time. The sleep level refers to a suppression level of power consumption during the sleep mode. When "priority to quick recovery" is selected, quicker recovery from the sleep mode is preferred to suppressing the power consumption. When "priority to energy saving" is selected, the suppression of the power consumption is preferred to quicker recovery from the sleep mode. The sleep time refers to the time before the sleep mode is automatically entered.

When the maintenance staff selects a radio button 32 corresponding to "priority to quick recovery" through the touch panel, the UI 12 receives the instruction to set the sleep level such that priority is given to quick recovery. When the maintenance staff inputs the sleep time as "10 minutes" in a combo box 33 through the touch panel, the UI 12 receives the instruction to set the sleep time to "10 minutes". When the maintenance staff finishes the initial setting related to the sleep function, and presses the registration button 31, the UI 12 acquires the parameter information inputted to the radio button 32 and the combo box 33, as initial parameter information.

The command storage device 14 receives, under the control of the controller 16, the command information including the function information indicating the sleep function, and the parameter information indicating the sleep level "priority to quick recovery" and the sleep time "10 minutes", from the UI 12. Since the customer ID has already been activated, the command storage device 14 stores the command information received from the UI 12, in association with the customer ID. At this point, the controller 16 stores the command information in the command storage device 14, either as the changeable command information or as the unchangeable command information, according to the instruction inputted by the user and received by the UI 12.

The communication device 15 makes wired or wireless communication with a non-illustrated external device. The communication device 15 may also communicate with the external device, via a network. The communication device 15 is a communication circuit. The external device is, for example, a personal computer or a file transfer protocol (FTP) server. For example, the personal computer generates the command information to be changed, according to an application program installed therein, and transmits the generated command information to the communication device 15 of the image forming apparatus 10. As another example, the personal computer may generate an extensible markup language (XML) file including the command information to be changed, according to the application program installed therein, and upload the generated XML file to the FTP server. The FTP server causes the communication device 15 of the image forming apparatus 10 to download the XML file that has been uploaded.

The controller 16 serves to control the overall operation of the image forming apparatus 10. The controller 16 controls the behavior of the image forming apparatus 10, according to the security level. The controller 16 sets the security level in either of the changeable command information and the unchangeable command information, according to the instruction inputted by the user and received by the UI 12, the detail of which will be subsequently described. The information indicating the security level is, for example, stored in the command storage device 14.

For example, when the security level is set to a low level, the controller 16 permits an access by the external device to the image forming apparatus 10 via the communication device 15, and an access by the image forming apparatus 10 to the external device via the communication device 15. When the security level is set to a high level, the controller 16 only permits the access by the external device to the image forming apparatus 10 via the communication device 15, and does not permit the access by the image forming apparatus 10 to the external device via the communication device 15.

When the security level is set to the high level, the controller 16 changes the setting of the function given to the image forming apparatus 10, according to the command information received by the communication device 15 from the external device, only when a specific condition is satisfied. The specific condition refers to the case where the function information included in the command information received by the communication device 15 from the external device accords with the function information included in the command information stored in the command storage device 14 as the changeable command information.

For example, when the external device transmits the command information expressed as "!R!KSUS "WKUP", 0; EXIT;", the communication device 15 receives such command information. When the security level is set to the low level, the controller 16 changes the sleep level of the sleep function in the command information to "priority to quick recovery", according to the command information received by the communication device 15, in the case where the function information included in the command information received by the communication device 15 from the external device accords with the function information included in the command information stored in the command storage device 14, with respect to both of the changeable command information and the unchangeable command information stored in the command storage device 14.

In this case, the controller 16 makes the mentioned change, only when the customer ID associated with the command information stored in the command storage device 14 accords with the customer ID associated with the command information received from the external device. Alternatively, the controller 16 may make the mentioned change, irrespective of the customer ID associated with the command information stored in the command storage device 14.

In contrast, when the security level is set to the high level, the controller 16 decides whether the function information "WKUP" received by the communication device 15 accords with the function information in the changeable command information stored in the command storage device 14. In other words, the controller 16 makes the mentioned decision only with respect to the changeable command information stored in the command storage device 14, and not with respect to the unchangeable command information. Upon deciding that the changeable command information containing the function information "WKUP" is stored in the command storage device 14, in other words that the function information "WKUP" received by the communication device 15 accords with the function information in the changeable command information stored in the command storage device 14, the controller 16 changes the sleep level of the sleep function "priority to quick recovery", according to the function information and the parameter information included in the command information received by the communication device 15. In this case, the controller 16 makes the mentioned change, only when the customer ID associated with the command information stored in the command storage device 14 accords with the customer ID associated with the command information received from the external device. Alternatively, the controller 16 may make the mentioned change, irrespective of the customer ID associated with the command information stored in the command storage device 14. In contrast, upon deciding that the changeable command information containing the function information "WKUP" is not stored in the command storage device 14, in other words that the function information "WKUP" received by the communication device 15 discords with the function information in the changeable command information stored in the command storage device 14, the controller 16 does not change the setting of the sleep function.

The I/O device 17 is an interface device for connecting the external device. The external device is, for example, a universal serial bus (USB) host, or a USB device. The USB host is, for example, a personal computer. The USB device is, for example, a storage medium such as a USB memory. The connection method of the I/O device 17 is not limited to the USB.

Figure 5:
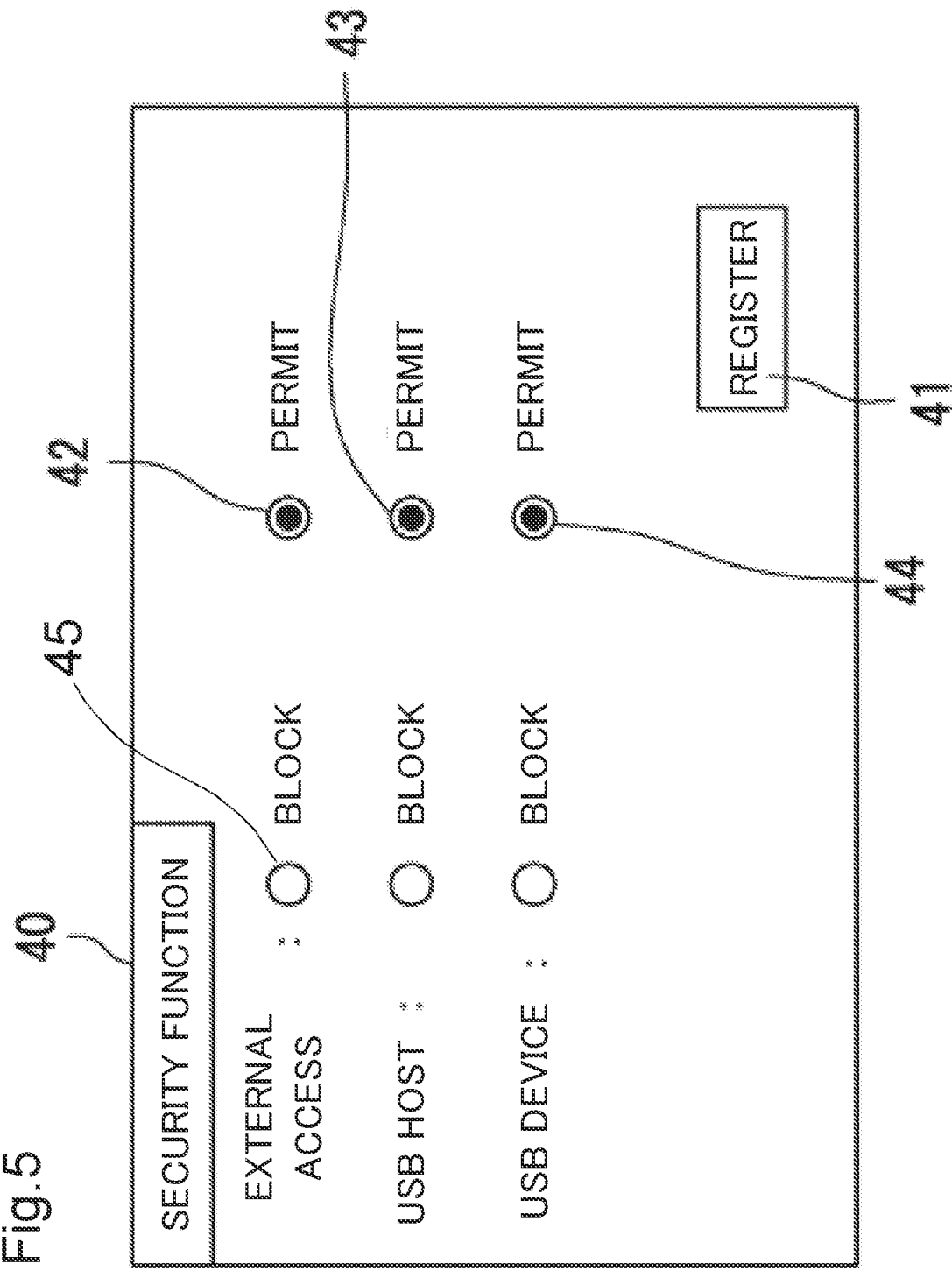
FIG. 5 is a schematic drawing showing an example of a security function registration screen according to the embodiment 1.
Figure 6:
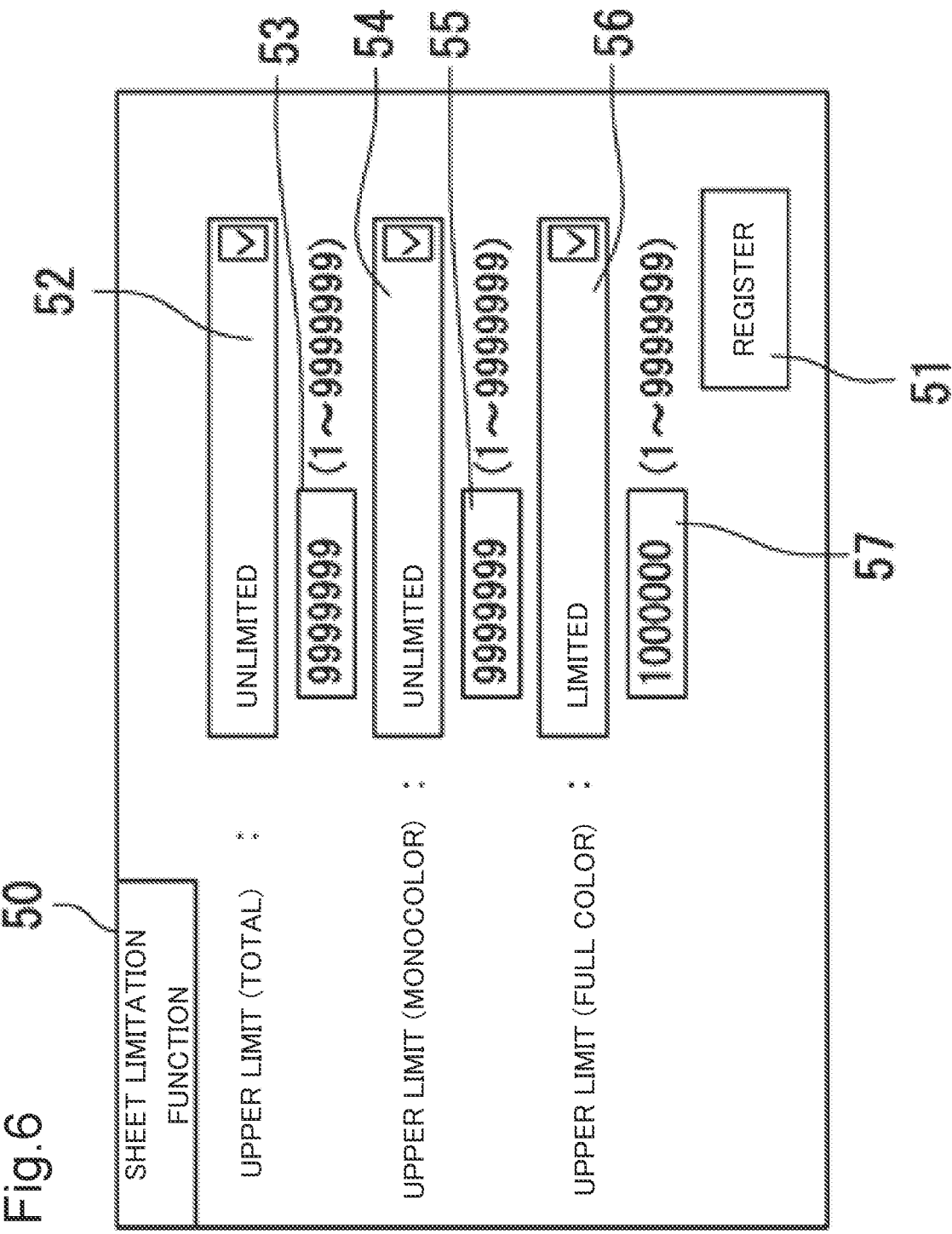
FIG. 6 is a schematic drawing showing an example of a sheet limitation function registration screen according to the embodiment 1 embodiment 1.

Referring now to FIG. 5 and FIG. 6, specific examples will be described, regarding the registration process of the command information that permits a change from outside. With reference to FIG. 4, the registration of the sleep function has been described. With reference to FIG. 5, the registration of the security function will be described, and the registration of the sheet limitation function will be described, with reference to FIG. 6.

FIG. 5 illustrates an example of a security function registration screen 40 according to the embodiment 1. The controller 16 causes the display device of the UI 12 to display the security function registration screen 40. The security function registration screen 40 includes a registration button 41, and items for selecting whether to block the external access, the USB host, and the USB device. The item "external access" is for setting the security level to either high level or low level. Selecting to block the external access sets the security level to the high level, and selecting to permit the connection of the external access sets the security level to the low level.

"USB host" and "USB device" are the items for selecting whether to permit the connection of the USB host and the USB device, to the I/O device 17. When the USB host and the USB device are blocked, the controller 16 restricts the connection of the USB host and the USB device. When the USB host and the USB device are not blocked, the controller 16 permits the connection of the USB host and the USB device.

The maintenance staff can set the security level to the low level, by selecting a radio button 42. The maintenance staff can establish the setting to permit the connection of the USB host, by selecting a radio button 43. The maintenance staff can establish the setting to permit the connection of the USB device, by selecting a radio button 44. Upon completing the selection of the radio buttons for the respective items, the maintenance staff presses the registration button 41. Here, when the maintenance staff selects a radio button 45, the security level against the external access is set to the high level. When the radio button 43 is selected, the UI 12 receives the instruction to set the security level against the external access to the low level, and receives the instruction to set the security level against the external access to the high level, when the radio button 45 is selected.

When the registration button 41 is pressed, the UI 12 acquires the settings and the instructions, represented by the respective radio buttons 42, 43, 44, and 45.

The controller 16 acquires the command information including the function information and the parameter information, received by the UI 12, and the instruction whether to set the security level to the high level or low level. The controller 16 stores the command information received from the UI 12 in the command storage device 14, in association with the customer ID already activated. The controller 16 sets the security level to the low level when the mentioned instruction indicates the low level, and to the high level when the instruction indicates the high level.

FIG. 6 illustrates an example of a sheet limitation function registration screen 50 according to the embodiment 1. The controller 16 causes the display device of the UI 12 to display the sheet limitation function registration screen 50. The sheet limitation function registration screen 50 includes an image indicating the function of "sheet limitation", a registration button 51, and images each representing a set value for the sheet limitation function, such as "upper limit (total)", "upper limit (monocolor)", and "upper limit (full color)". The "upper limit (monocolor)" refers to the upper limit of the number of sheets, on which the image forming device 18 of the image forming apparatus 10 can form a monocolor image. The "upper limit (full color)" refers to the upper limit of the number of sheets, on which the image forming device 18 of the image forming apparatus 10 can form a full color image. The "upper limit (total)" represents the total of the "upper limit (monocolor)" and the "upper limit (full color)".

The maintenance staff can select whether to set a limitation to the "upper limit (total)", by operating a combo box 52 of the "upper limit (total)". To set a limitation to the "upper limit (total)", the maintenance staff inputs the upper limit in a text box 53. When the upper limit is not to be set, the controller 16 automatically sets the initial value "9999999" of the upper limit, in the illustrated example.

The maintenance staff can select whether to set a limitation to the "upper limit (monocolor)", by operating a combo box 54 of the "upper limit (monocolor)". When the maintenance staff selects not to set a limitation to the "upper limit (monocolor)", the controller 16 automatically sets the initial value of the upper limit, in a text box 55. Likewise, the maintenance staff can select whether to set a limitation to the "upper limit (full color)", by operating a combo box 56 of the "upper limit (full color)". To set the limitation to the "upper limit (full color)", the maintenance staff inputs an upper limit "1000000", in a text box 57. Upon completing the initial setting with respect to the sheet limitation function, the maintenance staff presses a registration button 51.

When the registration button 51 is pressed, the UI 12 acquires the settings and the set values, respectively corresponding to the combo boxes 52, 54, and 56, and the text boxes 53, 55, and 57, as parameter information with respect to the sheet limitation function. Thus, in this case the UI 12 acquires the sheet limitation function as the function indicated by the function information, and the upper limit value (set value) for the sheet limitation function, as the parameter information.

The controller 16 acquires the command information including the function information indicating the sheet limitation function and the parameter information indicating the upper limit, received by the UI 12. The controller 16 stores the command information acquired from the UI 12 in the command storage device 14, in association with the customer ID already activated.

Figure 7:
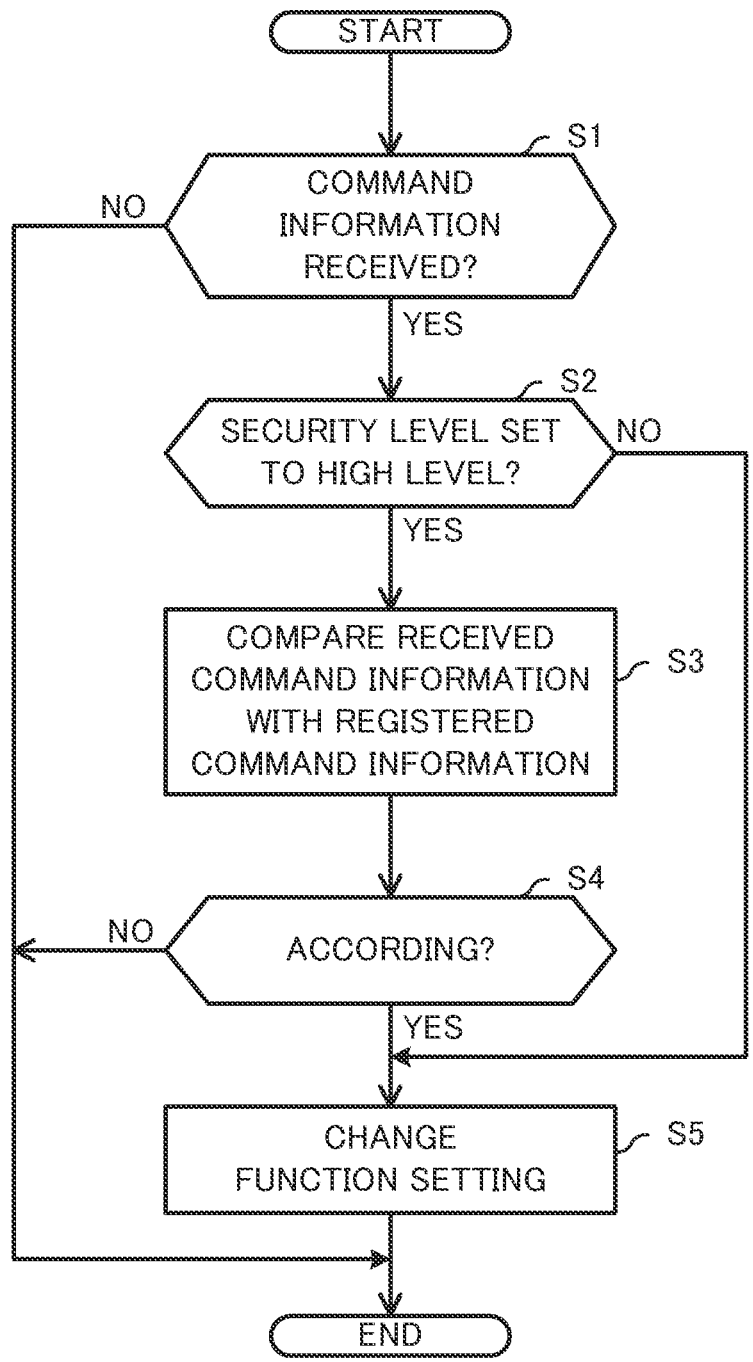
FIG. 7 is a flowchart showing an example of operations performed by the image forming apparatus according to the embodiment 1.

Referring now to FIG. 7, an operation performed by the image forming apparatus 10 will be described hereunder. FIG. 7 is a flowchart showing an example of the operation performed by the image forming apparatus 10 according to the embodiment 1. The image forming apparatus 10 repeatedly performs the operation according to the flowchart shown in FIG. 7. It will be assumed here that the image forming apparatus 10 is installed in A company, and that the customer ID of A company has already been activated. It is also assumed that the command information related to the sheet limitation function is already stored in the command storage device 14, as the changeable command information that permits a change from outside. For example, A company has paid a predetermined monthly fee to the manufacturing company or administrator of the image forming apparatus 10. Accordingly, the manufacturing company or administrator changes the upper limit of the number of sheets on which the image forming apparatus 10 can form an image, to a value based on the monthly fee. In this example, the manufacturing company or administrator transmits the command information related to the sheet limitation function to the image forming apparatus 10 of A company, from a personal computer which is the external device.

At step S1, the communication device 15 receives the command information related to the sheet limitation function, transmitted from the personal computer to the image forming apparatus 10 of A company. When the communication device 15 of the image forming apparatus 10 receives the command information (Yes at step S1), the controller 16 of the image forming apparatus 10 proceeds to step S2, but otherwise (No at step S1) the controller 16 finishes the operation.

At step S2, the controller 16 decides whether the security level of the image forming apparatus 10 is set to the high level or the low level. When the security level is set to the high level (Yes at step S2), the controller 16 proceeds to step S3. When the security level is set to the low level (No at step S2), the controller 16 proceeds to step S5.

At step S3, the controller 16 compares the function information in the command information received, with the function information in the command information stored in the command storage device 14 as the changeable command information. In other words, the controller 16 decides whether the function information in the command information received accords with the function information in the command information stored in the command storage device 14 as the changeable command information. For example, when the function information in the command information received indicates the sheet limitation function, the controller 16 decides whether the command information related to the sheet limitation function is stored in the command storage device 14. When the command information related to the sheet limitation function is stored in the command storage device 14 (Yes at step S4), the controller 16 proceeds to step S5. When the command information related to the sheet limitation function is not stored in the command storage device 14 (No at step S4), the controller 16 finishes the operation.

At step S5, the controller 16 changes the upper limit for the sheet limitation function, indicated by the parameter information in the command information stored as the changeable command information, according to the value represented by the parameter information included in the command information received. In other words, the controller 16 sets the upper limit for the sheet limitation function that has been changed, as the value to be utilized for the operation of the image forming device 18 of the image forming apparatus 10.

The image forming device 18 of the image forming apparatus 10 is allowed to form images up to the upper limit of the number of sheets, set by the controller 16 for the sheet limitation function. Accordingly, the manufacturing company or administrator can charge different monthly fees to the customers, depending on the upper limit for the sheet limitation function.

Here, the maintenance staff can also change the upper limit for the sheet limitation function, by directly operating the UI 12.

As described above with reference to FIG. 1 to FIG. 7, the image forming apparatus 10 includes the customer ID storage device 11, the UI 12, the activator 13, the command storage device 14, the communication device 15, the controller 16, and the image forming device 18. The customer ID storage device 11 contains in advance the customer ID list 11a including the customer IDs assigned to the respective customers. The UI 12 receives the user's instruction to activate one customer ID out of the customer ID list 11a, and the user's instruction to register the command information including the function information indicating the functions of the image forming apparatus 10, and the parameter information indicating the set values for the respective functions. The activator 13 activates the customer ID received by the UI 12, out of the customer IDs stored in the customer ID storage device 11.

The controller 16 stores the activated customer ID in the command storage device 14, in association with the command information received by the UI 12. The communication device 15 communicates with the external device. When the security level is set to the low level, the controller 16 changes the parameter information (changes the setting for the function), according to the command information received from the external device via the communication device 15, with respect to both of the changeable command information and the unchangeable command information stored in the command storage device 14. In contrast, when the security level is set to the high level, the controller 16 changes the setting for the function of the image forming apparatus 10, by changing the parameter information in the changeable command information, according to the command information received from the external device, when the function information included in the command information received from the external device via the communication device 15 accords with the function information included in the command information stored in the command storage device 14 as the changeable command information.

According to the foregoing embodiment, the image forming apparatus 10 receives the instruction to activate the customer ID, and the instruction to register the command information, only through its own UI 12. In addition, as the operation to be performed when the security level is set to the high level, the image forming apparatus 10 changes the setting for the behavior (function) of the image forming apparatus 10, only when the function information included in the command information received from the external device accords with the function information in the command information stored as the changeable command information. Therefore, the user can change the setting for a specific behavior of the image forming apparatus 10 from outside, while keeping the security level of the image forming apparatus 10 at the high level.

In the case of an existing image forming apparatus, when the security level in the security mode is set to "High", an external access to the image forming apparatus is restricted, and the external access to the image forming apparatus is permitted, when the security level is set to "Low". When the security level is set to "High", the setting for the behavior of the image forming apparatus is unable to be changed, from an external device connected to the image forming apparatus via a network, and the maintenance staff sent from the manufacturing company has to change the setting, by operating the user interface of the image forming apparatus. With the configuration according to the foregoing embodiment, in contrast, the setting for the behavior of the image forming apparatus can be changed from outside, while restricting the external access, in other words while keeping the security level of the image forming apparatus at a comparatively high level.

In addition, in the existing image forming apparatus, the relation between the security level and the type of the command information that permits the change from outside is often set up as firmware. In this case, the manufacturing company has to customize the firmware, so as to change the type of the command information that permits the change from outside. In other words, different firmware is prepared for each of the customers. In contrast, the image forming apparatus 10 according to the embodiment 1 accepts, via the UI 12, the registration of the command information that permits the change from outside, and therefore the versatility of the firmware can be attained.

Here, the command information that permits the change from outside can be exemplified by the command information including the function information, such as the sleep function shown in FIG. 4, and the parameter information for changing the sleep level.

The command information that permits the change from outside can also be exemplified by the command information including the function information, such as the function to connect the storage medium to the I/O device 17, for example shown in FIG. 5, and the parameter information indicating whether to permit the connection of the storage medium.

The command information that permits the change from outside can also be exemplified by the command information including the function information indicating the security function against the access of the external device via the communication device 15, for example shown in FIG. 5, and the parameter information for changing the security level.

Further, the command information that permits the change from outside can be exemplified by the command information including the function information, such as the sheet limitation function for limiting the number of sheets on which the image forming apparatus 10 can form an image, for example shown in FIG. 6, and the parameter information for changing the upper limit of the number of sheets. Here, the type of the command information that permits the change from outside is not limited to the cited examples.

The embodiment of the disclosure has been described as above, with reference to the drawings (FIG. 1 to FIG. 7).

However, the disclosure is not limited to the foregoing embodiment, but may be modified in various manners without departing from the scope of the disclosure. Hereunder, a variation 1 will be described.

Variation 1

In the example shown in FIG. 3, the activator 13 activates the customer ID, according to the operation of the maintenance staff performed on the UI 12 of the image forming apparatus 10. However, different arrangements may be adopted. For example, the external device may transmit an instruction to activate the customer ID. In this case, the communication device 15 of the image forming apparatus 10 receives the activation instruction from the external device, with respect to a specific customer ID. The activator 13 activates the specific customer ID, designated by the activation instruction received by the communication device 15, out of the customer IDs in the customer ID list 11a stored in the customer ID storage device 11. Such an arrangement enables the image forming apparatus 10 to activate the customer ID, according to the instruction from outside. Therefore, the customer can be exempted from the trouble of requesting the maintenance staff to perform the activation.

The external device may transmit an encrypted customer ID and activation instruction, to prevent leakage of information. In this case, the activator 13 decrypts the customer ID, and performs the activation.

INDUSTRIAL APPLICABILITY

The disclosure is applicable to various types of image forming apparatus, including both home-use and business-use models.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
a customer ID storage device containing in advance a list of customer identification information, allocated to each of customers;
a user interface device that receives an instruction to select one piece of customer identification information to be activated, from the list, and command information including function information indicating functions provided to the image forming apparatus, and parameter information for changing a setting of the function;
a communication device that communicates with an external device;
a control device including a processor, and configured to act, when the processor executes a control program, as:
a controller that permits or restricts an access of the external device via the communication device, according to a prespecified security level; and
an activator that activates the customer identification information received by the user interface device, out of the customer identification information stored in the customer ID storage device; and
a command storage device that stores therein the activated customer identification information in association with the command information received by the user interface device, the command information being stored as changeable command information that permits the function setting to be changed, or unchangeable command information that restricts the function setting from being changed, on a basis of the command information received from the external device, wherein the controller changes, when the security level is set to a low level, the function setting with respect to both of the changeable command information and the unchangeable command information, according to the command information received from the external device via the communication device, decides, when the security level is set to a high level, whether the function information included in the command information received from the external device via the communication device accords with the function information included in the command information stored in the command storage device, with respect to only the changeable command information, and keeps from changing the function setting according to the command information received from the external device via the communication device, upon deciding that the function information discords from each other, but changes the function setting according to the command information received from the external device, upon deciding that the function information accords with each other.

2. The image forming apparatus according to claim 1, wherein the activator activates the customer identification information received by the communication device, out of the customer identification information stored in the customer ID storage device, also when the communication device receives an instruction to activate the customer identification information, from the external device.

3. The image forming apparatus according to claim 1, wherein the communication device receives an instruction to activate a specific customer identification information, from the external device, and the activator activates, according to the activation instruction received, the specific customer identification information, out of the customer identification information in the customer identification information list, stored in the customer ID storage device.

4. The image forming apparatus according to claim 1, wherein the function information includes information indicating a sleep function of the image forming apparatus, and the parameter information includes information for changing a sleep level.

5. The image forming apparatus according to claim 1, wherein the function information includes information indicating a function to connect a storage medium to the image forming apparatus, and the parameter information includes information for changing whether the connection of the storage medium may be permitted.

6. The image forming apparatus according to claim 1, wherein the function information includes information indicating a security function, with respect to an access by the external device via the communication device, and the parameter information includes information for changing a security level.

7. The image forming apparatus according to claim 1, wherein the function information includes information indicating a function to limit a number of sheets on which the image forming apparatus can form an image, and the parameter information includes information for changing an upper limit of the number of sheets.

\* \* \* \* \*